United States Patent
Pursifull et al.

(10) Patent No.: US 10,718,301 B2
(45) Date of Patent: Jul. 21, 2020

(54) HIGH PRESSURE FUEL PUMP CONTROL FOR IDLE TICK REDUCTION

(71) Applicant: Ford Global Technologies, LLC, Dearborn, MI (US)

(72) Inventors: Ross Dykstra Pursifull, Dearborn, MI (US); Paul Zeng, Inkster, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1206 days.

(21) Appl. No.: 14/042,971

(22) Filed: Oct. 1, 2013

(65) Prior Publication Data

US 2015/0090227 A1    Apr. 2, 2015

(51) Int. Cl.
| | |
|---|---|
| F02B 17/00 | (2006.01) |
| F02M 39/00 | (2006.01) |
| F02D 41/38 | (2006.01) |
| F02D 41/40 | (2006.01) |
| F02M 59/36 | (2006.01) |

(52) U.S. Cl.
CPC .......... *F02M 39/00* (2013.01); *F02D 41/3845* (2013.01); *F02D 41/406* (2013.01); *F02M 59/366* (2013.01); *F02D 2200/0602* (2013.01); *F02D 2200/0611* (2013.01); *Y02T 10/44* (2013.01)

(58) Field of Classification Search
CPC ..... F02B 3/06; F02B 17/005; F02M 63/0007; F02M 37/0058; F02M 39/00; F02M 59/366; Y02T 10/32; F02D 2200/0602; F02D 2200/0611; F02D 41/3845; F02D 41/406
See application file for complete search history.

(56) References Cited

U.S. PATENT DOCUMENTS

| | | | | |
|---|---|---|---|---|
| 5,816,228 A * | 10/1998 | McCandless | ................. | 123/575 |
| 7,624,720 B1 | 12/2009 | Dokas et al. | | |
| 2009/0090331 A1* | 4/2009 | Pursifull | ....................... | 123/446 |
| 2010/0139624 A1 | 6/2010 | Surnilla et al. | | |
| 2014/0150751 A1* | 6/2014 | Cheever, Jr. | ............ | F02D 41/20 123/480 |
| 2015/0198081 A1* | 7/2015 | Surnilla et al. | ............... | 123/446 |

OTHER PUBLICATIONS

Surnilla, Gopichandra et al., "Methods and Systems for a Fuel System," U.S. Appl. No. 13/773,442, filed Feb. 21, 2013, 23 pages.
Pursifull, Ross D., "System and Method for Operating an Engine Combusting Liquefied Petroleum Gas," U.S. Appl. No. 13/970,519, filed Aug. 19, 2013, 30 pages.
Ulrey, Joseph N. et al., "Currect Pulsing Control Methods for Lift Fuel Pumps," U.S. Appl. No. 14/444,739, filed Jul. 28, 2014, 48 pages.

(Continued)

*Primary Examiner* — Hai H Huynh
*Assistant Examiner* — Gonzalo Laguarda
(74) *Attorney, Agent, or Firm* — Geoffrey Brumbaugh; McCoy Russell LLP

(57) ABSTRACT

A method for operating a solenoid valve coupled to the inlet valve of a fuel injection pump comprises adjusting a pull-in electrical energy of the solenoid valve based on a fuel injection pump volumetric efficiency.

20 Claims, 7 Drawing Sheets

(56) References Cited

OTHER PUBLICATIONS

Pursifull, Ross D., "Method and System for Supplying Liquefied Petroleum Gas to a Direct Fuel Injected Engine," U.S. Appl. No. 14/532,756, filed Nov. 4, 2014, 39 pages.
Ulrey, Joseph N. et al., "Optimizing Intermittent Fuel Pump Control," U.S. Appl. No. 14/558,363, filed Dec. 2, 2014, 44 pages.
Pursifull, Ross D., "Direct Injection Pump Control," U.S. Appl. No. 14/560,497, filed Dec. 4, 2014, 49 pages.

* cited by examiner

HIGH PRESSURE FUEL PUMP CONTROL FOR IDLE TICK REDUCTION

BACKGROUND AND SUMMARY

Many internal combustion engines utilize Gasoline Direct Injection (GDI) to increase the power efficiency and range over which the fuel can be delivered to the cylinder. GDI fuel injectors may require high pressure fuel for injection to create enhanced atomization for more efficient combustion. In many GDI applications a high-pressure fuel pump may be used to increase the pressure of fuel delivered to the fuel injectors. The high-pressure fuel pump may include a solenoid actuated "spill valve" (SV) or fuel volume regulator (FVR) that may be actuated to control flow of fuel into the high-pressure fuel pump. Throughout operation of the high-pressure fuel pump, actuation of the SV may generate noise/vibration/harshness (NVH).

In conventional vehicle systems, a method known as reduced solenoid current or "recur" is utilized to reduce the above described NVH. The recur method applies a predetermined low level of current to the SV that is just enough to initiate movement of the solenoid, after which the level of current supplied to the SV is promptly cut back to a hold current. Furthermore, complex feedforward and/or feedback control strategies including very high frequency processing rates based on measuring the current supplied to the SV are utilized to measure or determine the predetermined low level of current.

The inventors herein have recognized potential issues with this approach. Namely, there is a risk that the predetermined low level of current to the SV may fail to reliably initiate opening of the SV over a range of engine and fuel system conditions. Furthermore, equipping powertrain control modules (PCM's) with the circuitry for complex processing, including very high frequency processing rates, based on the supplied current to the SV is costly, and not possible for PCM's of some vehicle systems.

One approach that at least partially overcomes the above issues and achieves the technical result of reducing NVH associated with operation of the SV includes a method for operating a solenoid valve coupled to a direct injection fuel pump, comprising adjusting a pull-in electrical energy of the solenoid valve based on a fuel injection pump volumetric efficiency. In one example, such adjustments of the pull-in electrical energy are independent of sensed current of the SV. In this way, it is possible to improve system performance by providing sufficient SV current with feedback to enable maintenance of increased pump volumetric efficiency, while reducing NVH.

In another embodiment, a method of controlling fuel injection in a direct injection fuel system may comprise determining a pump volumetric efficiency of a fuel injection pump coupled to a solenoid valve, and in response to the determined pump volumetric efficiency, adjusting one or more of a valve pull-in current profile applied to the solenoid valve.

In another embodiment, a vehicle system may comprise an engine, a fuel system including a solenoid valve coupled to a fuel pump, the fuel system directly injecting fuel into the engine, and a controller, including instructions executable to adjust a valve pull-in current ramp rate of the solenoid valve based on an efficiency of the fuel pump, wherein the adjusting is performed only in response to the pump volumetric efficiency being less than a threshold pump volumetric efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION

DETAILED DESCRIPTION

Figure 1:
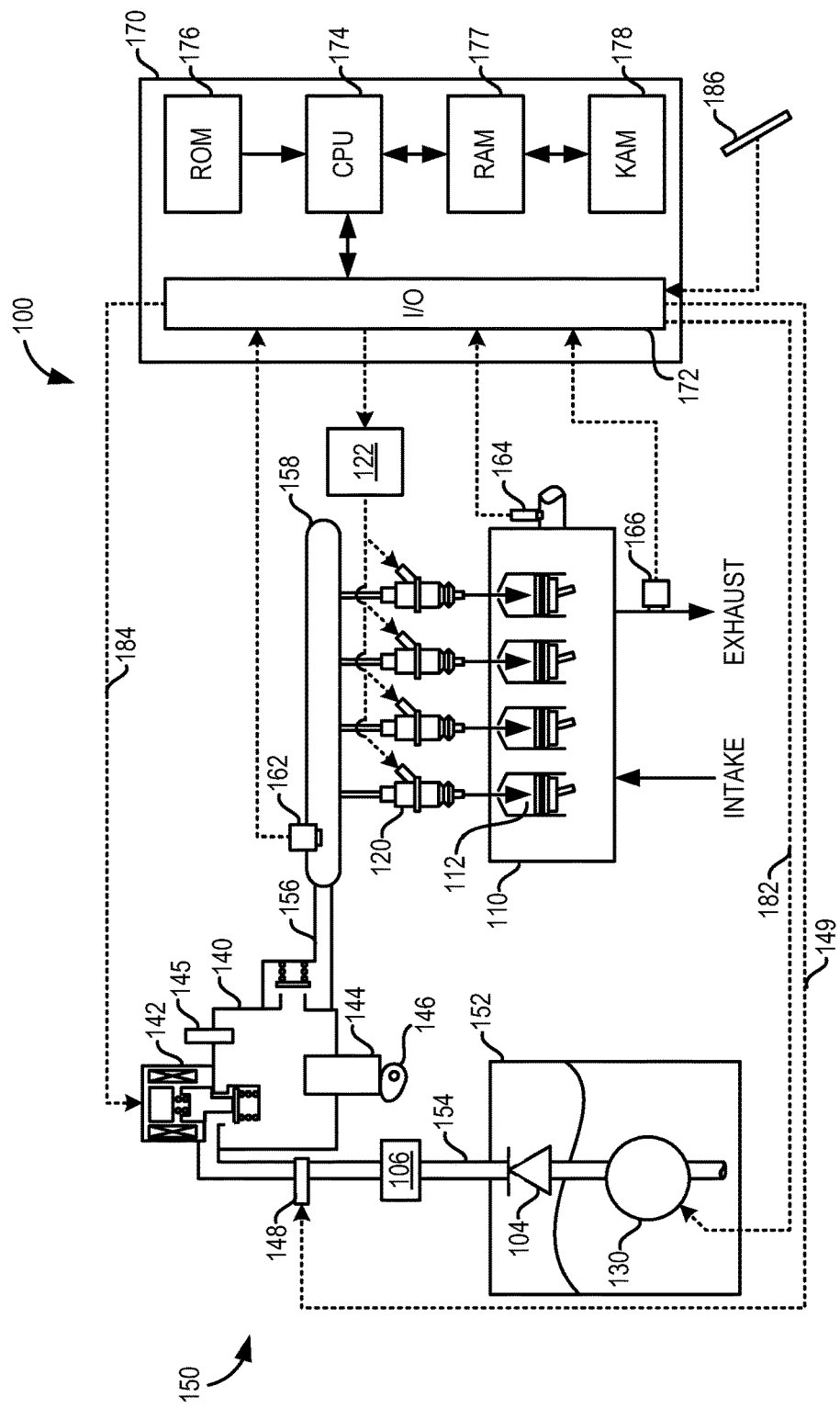
FIG. 1 shows a schematic diagram of an example fuel system coupled to an engine.

FIG. 1 shows a direct injection fuel system 100 coupled to an internal combustion engine 110, which may be configured as a propulsion system for a vehicle. The internal combustion engine 110 may comprise multiple combustion chambers or cylinders 112. Fuel can be provided directly to the cylinders 112 via in-cylinder direct injectors 120. As indicated schematically in FIG. 1, the engine 110 can receive intake air and exhaust products of the combusted fuel. The engine 110 may include a suitable type of engine including a gasoline or diesel engine.

Fuel can be provided to the engine 110 via the injectors 120 by way of a fuel system indicated generally at 150. In this particular example, the fuel system 150 includes a fuel storage tank 152 for storing the fuel on-board the vehicle, a lower pressure fuel pump 130 (e.g., a fuel lift pump), a higher pressure fuel pump or fuel injection pump 140, a fuel rail 158, and various fuel passages 154 and 156. In the example shown in FIG. 1, the fuel passage 154 carries fuel from the lower pressure pump 130 to the fuel injection pump 140, and the fuel passage 156 carries fuel from the fuel injection pump 140 to the fuel rail 158.

Fuel rail 158 may distribute fuel to each of a plurality of fuel injectors 120. Each of the plurality of fuel injectors 120 may be positioned in a corresponding cylinder 112 of engine 110 such that during operation of fuel injectors 120 fuel is injected directly into each corresponding cylinder 112. Alternatively (or in addition), engine 110 may include fuel injectors positioned at the intake port of each cylinder such that during operation of the fuel injectors fuel is injected in to the intake port of each cylinder. In, the illustrated embodiment, engine 110 includes four cylinders. However, it will be appreciated that the engine may include a different number of cylinders.

The lower pressure fuel pump 130 can be operated by a controller 170 to provide fuel to fuel injection pump 140 via fuel passage 154. The lower pressure fuel pump 130 can be configured as what may be referred to as a fuel lift pump. As one example, lower pressure fuel pump 130 can include an electric pump motor, whereby the pressure increase across the pump and/or the volumetric flow rate through the pump may be controlled by varying the electrical power provided to the pump motor, thereby increasing or decreasing the motor speed. For example, as the controller 170 reduces the electrical power that is provided to pump 130, the volumetric flow rate and/or pressure increase across the pump may be reduced. The volumetric flow rate and/or pressure increase across the pump may be increased by increasing the electrical power that is provided to the pump 130. As one example, the electrical power supplied to the lower pressure pump motor can be obtained from an alternator or other energy storage device on-board the vehicle (not shown), whereby the control system can control the electrical load that is used to power the lower pressure pump. Thus, by varying the voltage and/or current provided to the lower pressure fuel pump, as indicated at 182, the flow rate and pressure of the fuel provided to fuel injection pump 140 and ultimately to the fuel rail may be adjusted by the controller 170.

Low-pressure fuel pump 130 may be fluidly coupled to check valve 104 to facilitate fuel delivery and maintain fuel line pressure. In particular, check valve 104 includes a ball and spring mechanism that seats and seals at a specified pressure differential to deliver fuel downstream. In some embodiments, fuel system 150 may include a series of check valves fluidly coupled to low-pressure fuel pump 130 to further impede fuel from leaking back upstream of the valves. Check valve 104 is fluidly coupled to filter 106. Filter 106 may remove small impurities that may be contained in the fuel that could potentially damage engine components. Fuel may be delivered from filter 106 high-pressure fuel pump (e.g., fuel injection pump) 140. Fuel injection pump 140 may increase the pressure of fuel received from the fuel filter from a first pressure level generated by low-pressure fuel pump 130 to a second pressure level higher than the first level. Fuel injection pump 140 may deliver high pressure fuel to fuel rail 158 via fuel line 156. Fuel injection pump 140 will be discussed in further detail below with reference to FIG. 2. Operation of fuel injection pump 140 may be adjusted based on operating conditions of the vehicle in order to reduce noise/vibration/harshness (NVH) which may be perceived positively by a vehicle operator. Methods for adjusting operation of higher-pressure fuel injection pump 140 to reduce NVH will be discussed in further detail below with reference to FIGS. 3-5.

The fuel injection pump 140 can be controlled by the controller 170 to provide fuel to the fuel rail 158 via the fuel passage 156. As one non-limiting example, fuel injection pump 140 may utilize a flow control valve, a solenoid actuated "spill valve" (SV) or fuel volume regulator (FVR), indicated at 142 to enable the control system to vary the effective pump volume of each pump stroke. The fuel injection pump 140 may be mechanically driven by the engine 110 in contrast to the motor driven lower pressure fuel pump or fuel lift pump 130. A pump piston 144 of the fuel injection pump 140 can receive a mechanical input from the engine crank shaft or cam shaft via a cam 146. In this manner, fuel injection pump 140 can be operated according to the principle of a cam-driven single-cylinder pump.

As depicted in FIG. 1, a fuel sensor 148 is disposed downstream of the fuel lift pump 130. The fuel sensor 148 may measure fuel composition and may operate based on fuel capacitance, or the number of moles of a dielectric fluid within its sensing volume. For example, an amount of ethanol (e.g., liquid ethanol) in the fuel may be determined (e.g., when a fuel alcohol blend is utilized) based on the capacitance of the fuel. The fuel sensor 148 may be used to determine a level of vaporization of the fuel, as fuel vapor has a smaller number of moles within the sensing volume than liquid fuel. As such, fuel vaporization may be indicated when the fuel capacitance drops off. As described in greater detail with reference to FIGS. 3-5, the fuel sensor 148 may be utilized to determine the level of fuel vaporization of the fuel such that the controller 170 may adjust the lift pump pressure in order to reduce fuel vaporization within the fuel lift pump 130.

Further, in some examples, the fuel injection pump 140 may be operated as the fuel sensor 148 to determine the level of fuel vaporization. For example, a piston-cylinder assembly of the fuel injection pump 140 forms a fluid-filled capacitor. As such, the piston-cylinder assembly allows the fuel injection pump 140 to be the capacitive element in the fuel composition sensor. In some examples, the piston-cylinder assembly of the fuel injection 140 may be the hottest point in the system, such that fuel vapor forms there first. In such an example, the fuel injection pump 140 may be utilized as the sensor for detecting fuel vaporization, as fuel vaporization may occur at the piston-cylinder assembly before it occurs anywhere else in the system.

As shown in FIG. 1, the fuel rail 158 includes a fuel rail pressure sensor 162 for providing an indication of fuel rail pressure to the controller 170. An engine speed sensor 164 can be used to provide an indication of engine speed to the controller 170. The indication of engine speed can be used to identify the speed of fuel injection pump 140, since the pump 140 is mechanically driven by the engine 110, for example, via the crankshaft or camshaft. An exhaust gas sensor 166 can be used to provide an indication of exhaust gas composition to the controller 170. As one example, the gas sensor 166 may include a universal exhaust gas sensor (UEGO). The exhaust gas sensor 166 can be used as feedback by the controller to adjust the amount of fuel that is delivered to the engine via the injectors 120. In this way, the controller 170 can control the air/fuel ratio delivered to the engine to a prescribed setpoint.

Furthermore, controller 170 may receive other engine/exhaust parameter signals from other engine sensors such as engine coolant temperature, engine speed, throttle position, absolute manifold pressure, emission control device temperature, etc. Further still, controller 170 may receive signals from a noise sensor 145 at fuel injection pump 140 or SV 142 indicative of NVH levels generated by operation of fuel injection pump 140. Further still, controller 170 may provide feedback control based on signals received from fuel sensor 148, pressure sensor 162, engine speed sensor 164, and noise sensor 145, among others. For example, controller 170 may send signals to adjust a current level, current ramp rate, pulse width of a solenoid valve (SV) 142 of fuel injection pump 140, and the like to adjust operation of fuel injection pump 140, a fuel pressure set-point of fuel pressure regulator, and/or a fuel injection amount and/or timing based on signals from fuel sensor 148, pressure sensor 162, engine speed sensor 164, noise sensor 145, and the like.

The controller 170 can individually actuate each of the injectors 120 via a fuel injection driver 122. The controller 170, the driver 122, and other suitable engine system controllers can comprise a control system. While the driver 122 is shown external to the controller 170, in other examples, the controller 170 can include the driver 122 or can be configured to provide the functionality of the driver 122. The controller 170, in this particular example, includes an electronic control unit comprising one or more of an input/output device 172, a central processing unit (CPU) 174, read-only memory (ROM) 176, random-accessible memory (RAM) 177, and keep-alive memory (KAM) 178. The storage medium ROM 176 can be programmed with computer readable data representing non-transitory instructions executable by the processor 174 for performing the methods described below as well as other variants that are anticipated but not specifically listed.

As shown, direct injection fuel system 100 is a returnless fuel system, and may be a mechanical returnless fuel system (MRFS) or an electronic returnless fuel system (ERFS). In the case of an MRFS, the fuel rail pressure may be controlled via a pressure regulator (not shown) positioned at the fuel tank 152. In an ERFS, a pressure sensor 162 may be mounted at the fuel rail 158 to measure the fuel rail pressure relative to the manifold pressure. The signal from the pressure sensor 162 may be fed back to the controller 170, which controls the driver 122, the driver 122 modulating the voltage to the fuel injection pump 140 for supplying the correct duel pressure and fuel flow rate to the injectors.

Although not shown in FIG. 1, in other examples, direct injection fuel system 100 may include a return line whereby excess fuel from the engine is returned via a fuel pressure regulator to the fuel tank via a return line. A fuel pressure regulator may be coupled in line with a return line to regulate fuel delivered to fuel rail 158 at a set-point pressure. To regulate the fuel pressure at the set-point, the fuel pressure regulator may return excess fuel to fuel tank 152 via the return line. It will be appreciated that operation of fuel pressure regulator may be adjusted to change the fuel pressure set-point to accommodate operating conditions.

Figure 2:
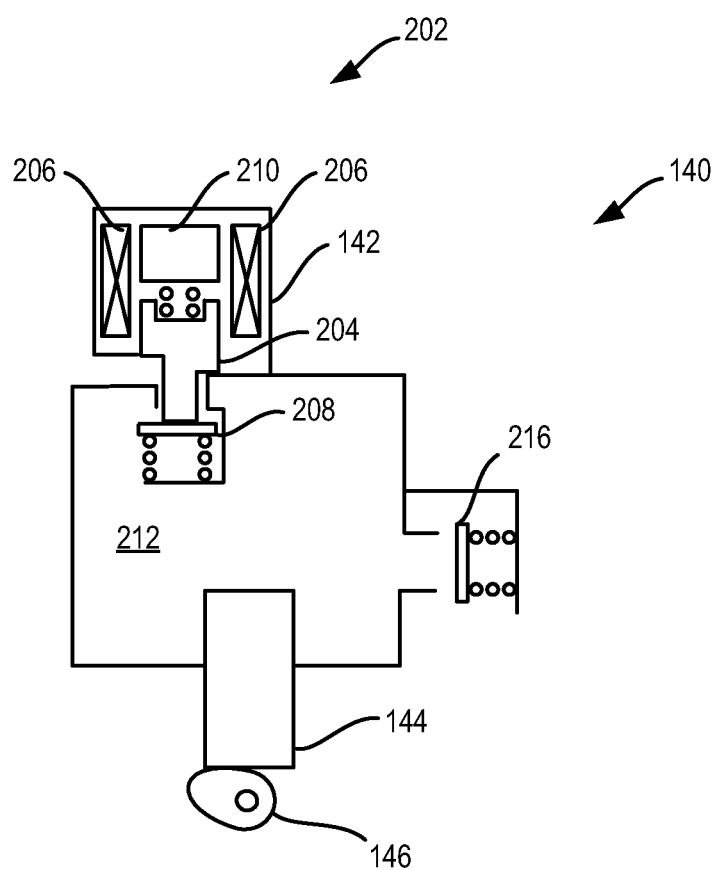
FIG. 2 shows a schematic diagram of a solenoid valve coupled to a high pressure fuel injection pump of the fuel system of FIG. 1.

FIG. 2 shows an example of a fuel injection pump 140. Fuel injection pump 140 delivers fuel to the engine via intake and delivery pump strokes of fuel supplied to fuel rail 118. When not energized, the inlet valve is held open and no pumping can occur. When energized, the solenoid takes a position such that inlet valve 204 functions as a check valve. Depending on the timing of this event, a given amount of pump displacement is used to push a given fuel volume into the fuel rail, thus it functions as a fuel volume regulator. As such, the angular timing of the solenoid refraction may control the effective pump displacement. Furthermore, the solenoid current application may influence the pump noise. SV 202 includes solenoids 206 that may be electrically energized by controller 170 to draw inlet valve 204 away from the solenoids in the direction of stop plate 208 to close SV 202. In particular, controller 170 may send a pump signal that may be modulated to adjust the operating state (e.g., open or check valve) of SV 202. Modulation of the pump signal may include adjusting a current level, current ramp rate, a pulse-width, a duty cycle, or another modulation parameter. Further, inlet valve 204 may be biased such that, upon solenoids 206 becoming de-energized, inlet valve 204 may move in the direction of the solenoids until contacting inlet valve plate 210 to be placed in an open state in which fuel may flow into pressure chamber 212 of fuel injection pump 140. Operation of piston 144 of fuel injection pump 140 may increase the pressure of fuel in pressure chamber 212. Upon reaching a pressure set-point, fuel may flow through outlet valve 216 to fuel rail 158.

Figure 3:
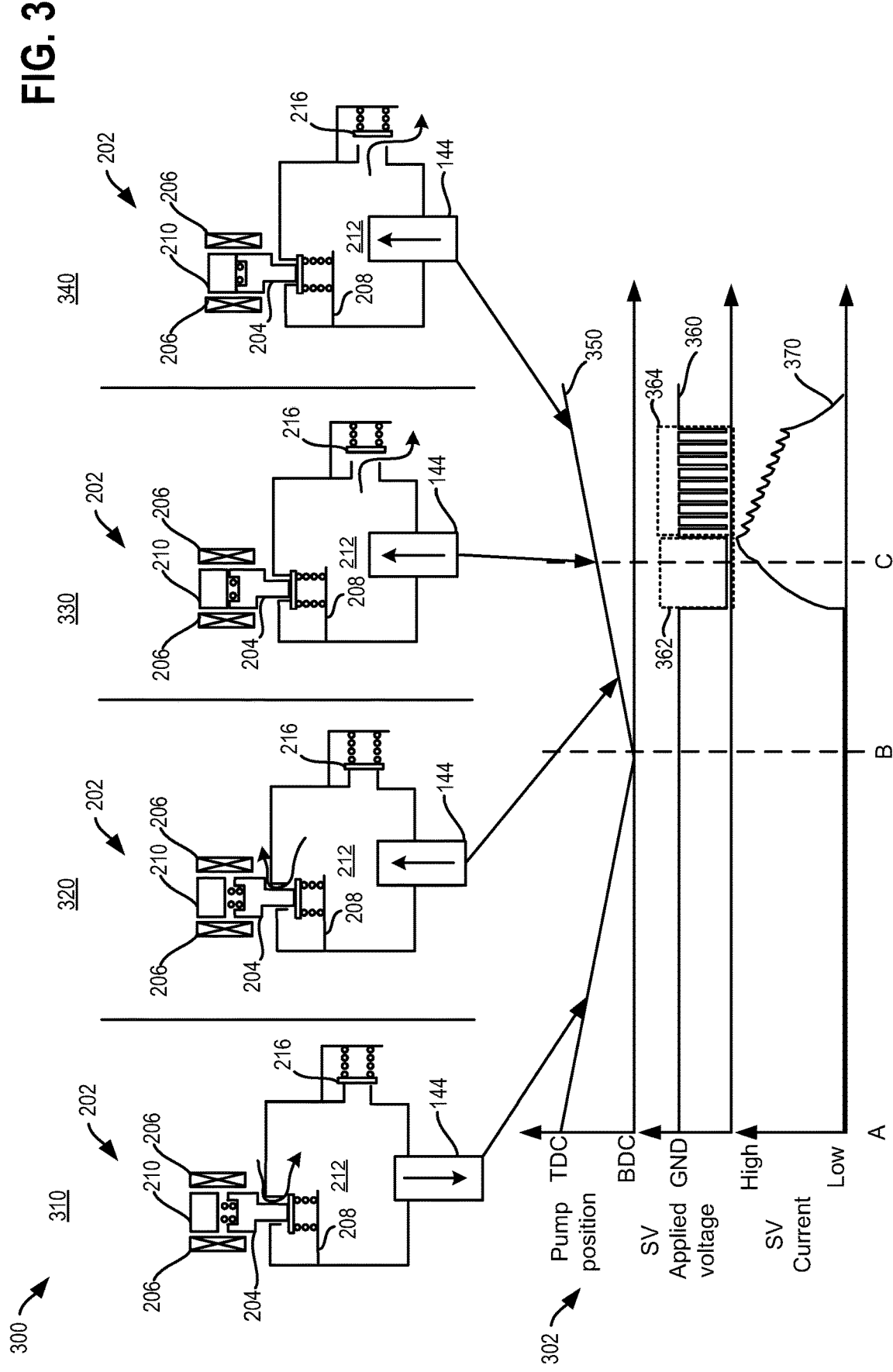
FIG. 3 shows an example intake and delivery sequence of a high pressure fuel injection pump of the fuel system of FIG. 1.

Turning now to FIG. 3, it illustrates an example operating sequence 300 of fuel injection pump 140. In particular, sequence 300 shows the operation of fuel injection pump 140 during intake and delivery strokes of fuel supplied to fuel rail 158. Each of the illustrated moments (e.g., 310, 320, 330, 340) of sequence 300 show events or changes in the operating state of fuel injection pump 140. Signal timing chart 302 shows a pump position 350, a SV applied voltage signal 360 for controlling fuel intake into the fuel injection pump 140, and a SV current 370 resulting from the applied voltage signal 360.

At 310, beginning at time A, the fuel injection pump may begin an intake stroke as piston 144 positioned at top-dead-center (TDC) is pushed outwards from pressure chamber 212 and SV applied voltage (or pull-in applied voltage) 360 is at 0% duty cycle (GND) while inlet valve 204 is open, allowing fuel to enter the pressure chamber 212. Next, during 320 beginning at time B piston 144 reaches bottom-dead-center (BDC) and is refracted into pressure chamber 212. In preparation for fuel delivery, a pull-in impulse 362 of the SV applied voltage 360 is initiated to close inlet valve 204. In response to the pull-in impulse 362, the solenoid current 370 begins to increase, closing inlet valve 204. During the pull-in impulse 362, the SV applied voltage 360 signal may be 100% duty cycle, however, the SV applied voltage 360 signal may also be less than 100% duty cycle. Furthermore, the duration of the pull-in impulse 362, the duty cycle impulse level, and the duty cycle impulse profile (e.g., square profile, ramp profile, and the like) may be adjusted corresponding to the SV, fuel system, engine operating conditions, and the like, in order to reduce pull-in current and duration, thereby reducing NVH during fuel injection. By controlling the pull-in current level, pull-in current duration or the pull-in current profile, the interaction between the solenoid armature and the fuel injection pump's inlet valve 204 may be controlled. Also shown during 320, some fuel in pressure chamber 212 may be pushed out through inlet valve 204 before inlet valve 204 fully closes while the piston 144 is retracted from BDC.

At time C (moment 330), inlet valve 204 fully closes in response to the SV applied voltage pull-in impulse and the increasing solenoid current 370. Furthermore, outlet valve 216 is opened, allowing for fuel injection from the pressure chamber 212 into fuel rail 158. After time C during 340, the SV pull-in applied voltage 360 may be set to a holding signal 364 of approximately 25% duty cycle to command a holding solenoid current 370 in order to maintain the inlet valve 204 in the closed position during fuel delivery. At the end of the holding current duty cycle, SV applied voltage is reduced to ground (GND), lowering the solenoid current 370, and opening inlet valve 204 (while closing outlet valve 216) to begin another fuel intake phase. Furthermore, the duty cycle level and signal duration of holding signal 364 may be adjusted in order to reduce solenoid current and NVH. Further still, as described herein, by lowering the current ramp rate to the SV based on a fuel injection pump volumetric efficiency, NVH arising from operation of the SV may be reduced as compared to conventional methods of controlling the SV for regulating fuel injection.

Figure 4:
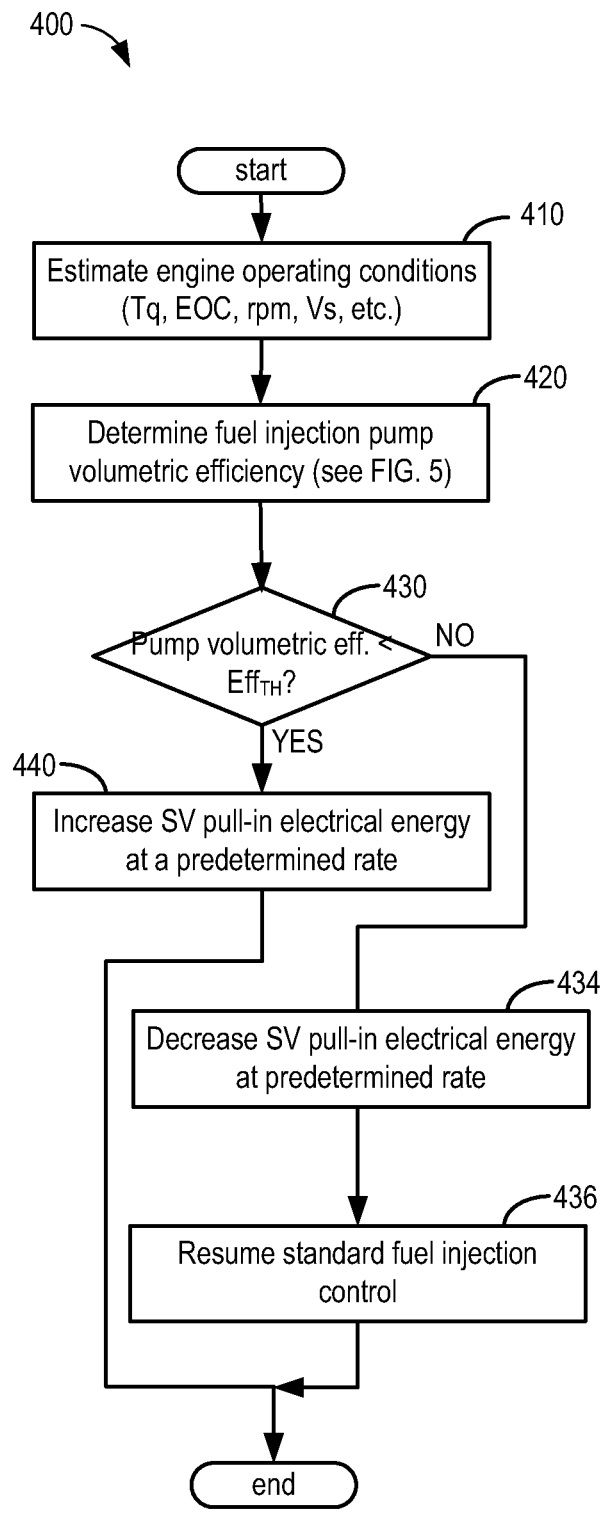
FIG. 4 shows a flow chart of an example method for operating a solenoid valve coupled to a high pressure fuel injection pump.

Turning now to FIG. 4, it illustrates a flowchart for an example method 400 of operating a mechanical solenoid valve coupled to a high pressure fuel pump. As an example, method 400 may be executed by controller 170. Method 400 begins at 410 where the vehicle operating conditions such as engine on condition (EOC), torque (Tq), vehicle speed (Vs), battery state of charge (SOC), engine speed (rpm), and the like are determined. Next, method 400 continues at 420 where a fuel injection pump volumetric efficiency is determined.

Figure 5:
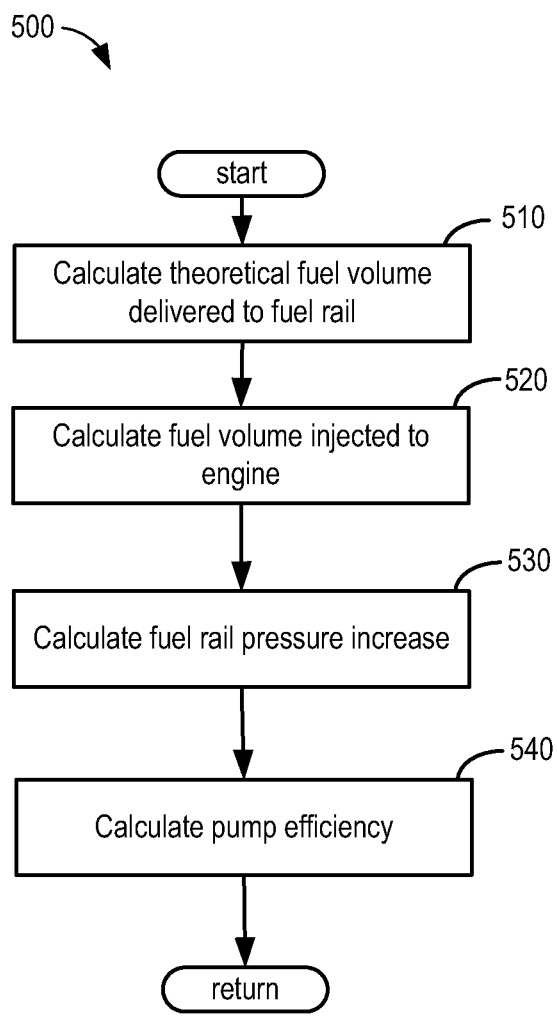
FIG. 5 shows a flow chart for an example method of calculating pump volumetric efficiency.

Turning now to FIG. 5, it illustrates an example method 500 for calculating a fuel injection pump volumetric efficiency. Method 500 begins by calculating a theoretical fuel volume delivered to fuel rail 158. The theoretical fuel volume delivered to fuel rail 158 may comprise the fuel volume into fuel rail 158 at 100% efficiency of fuel injection pump, and may be determined according to equation (1):

Fuel volume into rail at 100% Efficiency=(number of pump strokes*pump command*full volume per stroke)  (1)

Using equation (1), the fuel volume into the rail at 100% efficiency may be calculated over a predetermined time period, for example over a predetermined number of pump strokes. For example, since the direct injection fuel pump is cycled at high frequency, a predetermined number of pump strokes may comprise a plurality of pump strokes so that the fuel volume may be accurately calculated. The full volume per stroke may be predetermined according to the pump design, type of pump and/or the pump operation.

Next, method 500 continues at 520, where it calculates the actual fuel volume injected to the engine according to equation (2):

Fuel volume injected=$\Sigma_i$[(Desired fuel mass injected)*fuel density]  (2)

In equation (2), the desired fuel mass injected multiplied by the fuel density yields the desired fuel volume injected, which is summed over all i injectors/cylinders to determine the total fuel volume injected to the engine. For consistency, equation (2) is calculated over the same time period or number of pump strokes as equation (1).

Method 500 then continues at 530, where the fuel rail pressure increase resulting from the fuel pumped to the fuel rail 158 is determined according to equation (3):

Fuel rail pressure increase=Net fuel volume into fuel rail*Effective modulus  (3)

Alternately, the fuel rail pressure increase may be expressed by the relationship shown in equation (3a):

$$\text{Fuel rail pressure increase} = \frac{\text{change in fuel volume}}{\text{fuel rail volume}} * \text{bulk modulus} \quad (3a)$$

Here the net fuel volume into the fuel rail may be determined from the difference between the theoretical fuel volume delivered to the fuel rail according to equation (1) multiplied by the pump volumetric efficiency and the fuel volume injected to the engine according to equation (2). The effective modulus characterizes the pressure increase at the fuel rail for a given volume of net fuel volume delivered into the fuel rail. The effective modulus may depend on the fuel rail design (e.g., volume, material of construction, and the like), fuel composition, the fuel system conditions (temperature, pressure, and the like), and the like. For example, a typical effective modulus may be 1.5 MPa/0.25 cc of fuel, and a typical bulk modulus may be 1.5 MPa. The net fuel volume into the fuel rail can be calculated according to equation (4):

Net fuel volume into rail=(Fuel volume into rail @100% efficiency*Pump volumetric efficiency)−Fuel volume injected  (4)

Accordingly, substituting equations (1) and (2) into (3) yields equation (5):

Fuel rail pressure increase=((Fuel volume into rail @100% efficiency*Pump volumetric efficiency)−Fuel volume injected)*Effective modulus  (5)

Next, method 500 determines the pump volumetric efficiency at 540 by solving equation (5) according to equations (6) and (7):

$$\text{Pump volumetric efficiency} = \frac{\text{Actual pump volume input}}{\text{Nominal pump volume input}} \quad (6)$$

$$\text{Pump volumetric efficiency} = \frac{\left(\left(\frac{\text{Fuel rail pressure increase}}{\text{Effective modulus}}\right) + \text{Fuel Volume Injected}\right)}{\left(\begin{array}{c}\text{Number of pump strokes} * \\ \text{pump command} * \text{full volume per stroke}\end{array}\right)} \quad (7)$$

Thus, according to equation (7), pump volumetric efficiency may be calculated from measured quantities.

Returning now to method 400, after determining the fuel injection pump volumetric efficiency according to method 500 and equation (7), method 400 continues at 430 where it determines if the fuel injection pump volumetric efficiency is less than a threshold fuel injection pump volumetric efficiency, $\text{Eff}_{TH}$. If the fuel injection pump volumetric efficiency is less than $\text{Eff}_{TH}$, then controller 170 at 440 may increase a pull-in electrical energy level of the SV at a predetermined rate. In one embodiment, controller 170 may adjust an SV electrical energy level for solenoid pull-in. For example, adjusting the electrical energy level may include adjusting the solenoid pull-in current by adjusting the level (e.g., duty cycle) or the duration of the solenoid pull-in applied voltage. Furthermore, the pull-in electrical energy level for solenoid pull-in may be adjusted at a predetermined rate only in response to the fuel injection pump volumetric efficiency being less than $\text{Eff}_{TH}$. Furthermore, the SV pull-in electrical energy may be adjusted to a higher predetermined level or a steeper profile. However, the adjustment to the SV pull-in electrical energy may be reduced or limited as compared to conventional SV control methods in order to reduce NVH during operation of the SV. For example, lowering the duty cycle and/or duration of the solenoid pull-in applied voltage may reduce the pull-in current ramp rate of the SV such that the current ramp rate changes less than a predetermined amount over a predetermined number of pump strokes, and the number and/or severity of NVH ticks at the SV may be reduced. In this manner, a feedback control strategy may maintain a target injection pump volumetric efficiency for achieving NVH reduction associated with SV operation while maintaining desired fuel injection for vehicle driveability, operability, and the like.

Further still, by controlling SV operation based on a calculated pump volumetric efficiency determined from measured quantities according to equations (1)-(7), feedback control of the SV for controlling fuel injection may be performed without complex feedforward or feedback control processing and complex control circuitry, while reducing NVH associated with SV operation.

Returning to method 400, if at 430, the fuel injection pump volumetric efficiency is not less than $\text{Eff}_{TH}$, method 400 continues at 434, where the SV pull-in electrical energy is decreased at a predetermined rate. In one embodiment, controller 170 may adjust an SV electrical energy level for solenoid pull-in. For example, adjusting the electrical energy level may include adjusting the solenoid pull-in current by adjusting the level (e.g., duty cycle) or the duration of the solenoid pull-in applied voltage. Furthermore, the SV pull-in electrical energy may be adjusted to change the SV pull-in current to a lower predetermined level or to effect a gradual pull-in current profile. In particular, the adjustment to the SV pull-in electrical energy may be reduced or limited as compared to conventional SV control methods in order to reduce NVH during operation of the SV. For example, lowering the duty cycle and/or duration of the solenoid pull-in applied voltage may reduce the pull-in current ramp rate of the SV such that the current ramp rate changes less than a predetermined amount over a predetermined number of pump strokes, and the number and/or severity of NVH ticks at the SV may be reduced. In another example, a duty cycle and/or a duration of an SV holding signal may be reduced. Accordingly, a feedback control strategy may maintain a target injection pump volumetric efficiency for achieving NVH reduction associated with SV operation while maintaining desired fuel injection for vehicle driveability, operability, and the like.

Further still, by controlling SV operation based on a calculated pump volumetric efficiency determined from measured quantities according to equations (1)-(7), feedback control of the SV for controlling fuel injection may be performed without complex feedforward or feedback control processing and complex control circuitry, while reducing NVH associated with SV operation.

After 434, method 400 continues at 436 where standard fuel injection system control may be resumed. After 440 and 436 method 400 ends.

In this manner, a method for operating a solenoid valve coupled to the inlet valve of a fuel injection pump may comprise adjusting a pull-in electrical energy of the solenoid valve based on a fuel injection pump volumetric efficiency. The adjusting may be performed only in response to the fuel injection pump volumetric efficiency being less than a threshold fuel injection pump volumetric efficiency. Furthermore, adjusting the pull-in electrical energy may comprise increasing a pull-in current ramp rate of the solenoid valve in response to the fuel injection pump volumetric efficiency being less than a threshold fuel injection pump volumetric efficiency. Further still, adjusting the pull-in electrical energy may comprise increasing a pull-in applied voltage duty cycle of the solenoid valve. Further still, adjusting the pull-in electrical energy may comprise increasing pull-in applied voltage duration of the solenoid valve. Further still, the adjusting may be performed independent from feedback of a solenoid valve current. Further still, the adjusting may be performed independent from feed forward control based on a solenoid valve pull-in current ramp rate.

The fuel injection pump volumetric efficiency may be calculated based a commanded pump volume, an injection volume, and a pressure change in the fuel rail. Furthermore, the pump volumetric efficiency may be calculated based on a sum of a net fuel volume into a fuel rail and a fuel volume injected.

In this manner, a method of controlling fuel injection in a direct injection fuel system may comprise determining a pump volumetric efficiency of a fuel injection pump coupled to a fuel volume regulator, and in response to the determined pump volumetric efficiency, adjusting a valve pull-in current profile of the fuel volume regulator. Adjusting the valve pull-in current profile may comprise decreasing the valve pull-in current ramp rate in response to the calculated pump volumetric efficiency being greater than the threshold pump volumetric efficiency. Furthermore, adjusting the valve pull-in current profile may comprise increasing the valve pull-in current ramp rate in response to the calculated pump volumetric efficiency being less than the threshold pump volumetric efficiency. The pump volumetric efficiency may be calculated based on a desired fuel amount pumped by the fuel injection pump and an actual fuel amount pumped by the fuel injection pump. Furthermore, the actual fuel pumped is based on a fuel quantity injected and a fuel rail pressure change over a predetermined number of pump strokes.

Figure 6:
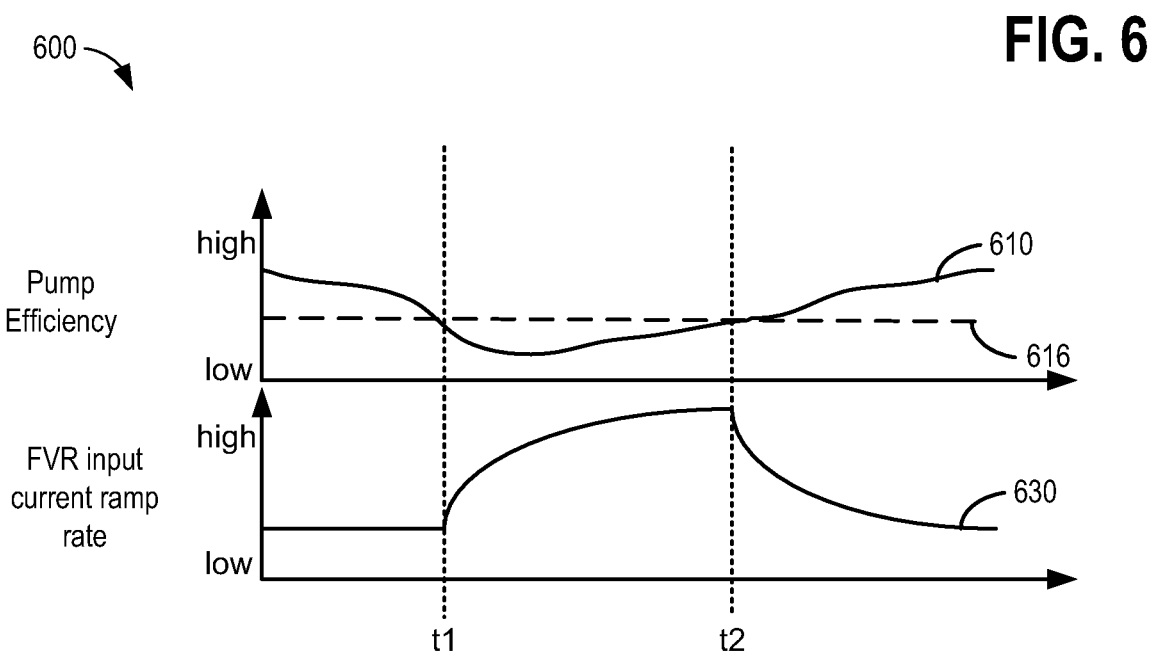
FIG. 6 shows an example timeline for operating a solenoid valve coupled to a high pressure fuel injection pump.

Turning now to FIG. 6, it illustrates an example timeline 600 for a vehicle system including an SV or fuel volume regulator (FVR), and a controller for controlling operation of the FVR based on a fuel injection pump volumetric efficiency. Timeline 600 includes trendlines for fuel injection pump volumetric efficiency 610, and FVR input current ramp rate 630. Timeline 600 also depicts a threshold pump volumetric efficiency, $Eff_{TH}$ at 616.

Prior to t1, the fuel injection pump volumetric efficiency 610 is greater than $Eff_{TH}$, and the FVR input current ramp rate is not adjusted by controller 170. At t1, the fuel injection pump volumetric efficiency 610 drops below $Eff_{TH}$ 616. In response, controller 170 begins to increase the FVR input current ramp rate 630. In one example, the input current ramp rate may comprise the pull-in current ramp rate. Between t1 and t2, in response to the FVR input current ramp rate 630 being increased, the fuel injection pump volumetric efficiency 610 gradually increases. At t2, the fuel injection pump volumetric efficiency crosses above $Eff_{TH}$ 616. Accordingly, controller 170 reduces the FVR input current ramp rate 630. Although not shown in FIG. 6, as described with reference to FIGS. 4-5, the SV pull-in electrical energy may also be adjusted when the pump volumetric efficiency is greater than $Eff_{TH}$. For example, when the pump volumetric efficiency is greater than $Eff_{TH}$, SV pull-in electrical energy may be adjusted by decreasing a pull-in duty cycle or duration in order to reduce a pull-in current ramp rate, thereby reducing NVH associated with fuel injection.

Figure 7:
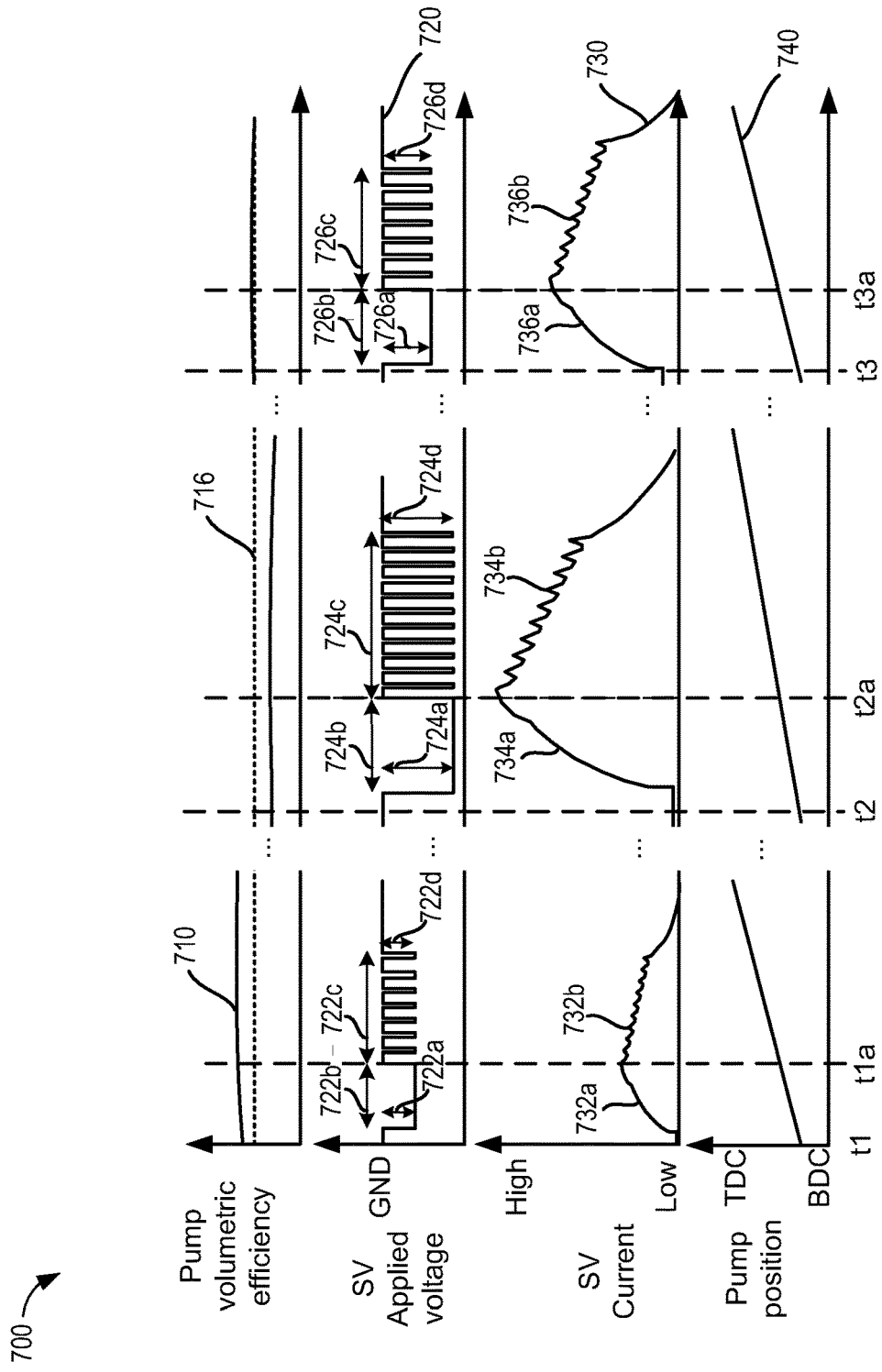
FIG. 7 shows an example timeline for operating a solenoid valve coupled to a high pressure fuel injection pump.

Turning now to FIG. 7, it illustrates an example timeline 700 for operating a solenoid valve coupled to a high pressure fuel injection pump. The solenoid valve coupled to the fuel injection pump may be included in a vehicle system including an SV or fuel volume regulator (FVR), and a controller for controlling operation of the FVR based on a fuel injection pump volumetric efficiency. Timeline 700 includes trendlines for fuel injection pump volumetric efficiency 710, SV applied voltage 720, SV current 730, and pump position 740. Timeline 700 also depicts a threshold pump volumetric efficiency, $Eff_{TH}$ at 716.

Timeline 700 depicts three example moments of SV operation: at t1, the pump volumetric efficiency is greater than $Eff_{TH}$; at t2, the pump volumetric efficiency is less than $Eff_{TH}$; and at t3, the pump volumetric efficiency is approximately equal to $Eff_{TH}$.

Accordingly at moment t1, during fuel injection, the pump position 740 is moved from BDC towards TDC (as shown from t1 to t1a) to close inlet valve 204, and the SV pull-in applied voltage level (e.g., duty cycle) 722a and SV pull-in applied voltage duration 722b are at relatively lower levels. In response, the SV current pull-in profile (e.g., ramp rate) 732a may be relatively lower, exhibiting a slower rate of change. At time t1a, the inlet valve 204 closes and following t1a, a hold signal may be applied by the controller to maintain inlet valve 204 closure during fuel injection. Since the pump volumetric efficiency is greater than $Eff_{TH}$, the SV hold applied voltage level (e.g., duty cycle) 722d, and the SV hold applied voltage duration 722c may also be set to a relatively lower level. In response, the SV current hold profile 732b may be relatively lower, exhibiting a slower rate of change.

At moment t2, responsive to the pump volumetric efficiency being less than $Eff_{TH}$, during fuel injection, as the pump position 740 is moved from BDC towards TDC (as shown from t2 to t2a) to close inlet valve 204, the SV pull-in applied voltage level (e.g., duty cycle) 724a and SV pull-in applied voltage duration 724b are at relatively higher levels. In response, the SV current pull-in profile (e.g., ramp rate) 734a may be relatively higher, exhibiting a faster rate of change. At time t2a, the inlet valve 204 closes and following t2a, a hold signal may be applied by the controller to maintain inlet valve 204 closure during fuel injection. Since the pump volumetric efficiency is less than $Eff_{TH}$, the SV hold applied voltage level (e.g., duty cycle) 724d, and the SV hold applied voltage duration 724c may also be set to a relatively higher level. In response, the SV current hold profile 734b may be relatively higher, exhibiting a faster rate of change.

At moment t3, responsive to the pump volumetric efficiency being approximately equal to $Eff_{TH}$, during fuel injection, as the pump position 740 is moved from BDC towards TDC (as shown from t3 to t3a) to close inlet valve 204, the SV pull-in applied voltage level (e.g., duty cycle) 726a and SV pull-in applied voltage duration 726b are at relatively moderate levels. In response, the SV current pull-in profile (e.g., ramp rate) 736a may be relatively moderate, exhibiting a more moderate rate of change. At time t3a, the inlet valve 204 closes and following t3a, a hold signal may be applied by the controller to maintain inlet valve 204 closure during fuel injection. Since the pump volumetric efficiency is approximately equal to $Eff_{TH}$, the SV hold applied voltage level (e.g., duty cycle) 726d, and the SV hold applied voltage duration 726c may also be set to a relatively more moderate level. In response, the SV current hold profile 736b may be relatively moderate, exhibiting a more moderate rate of change.

In FIG. 7, although the SV pull-in applied voltage duty cycles 722a, 724a, and 726a and the SV hold applied voltage duty cycles 722d, 724d, and 726d are shown as approximately equivalent, respectively, in some examples, the SV pull-in applied voltage duty cycle may be different from the SV hold applied voltage duty cycle.

In this manner, a vehicle system may comprise an engine, a fuel system including a solenoid valve coupled to a fuel pump, the fuel system directly injecting fuel into the engine, and a controller, including instructions executable to adjust a valve pull-in current ramp rate of the solenoid valve based on an efficiency of the fuel pump, wherein the adjusting is performed only in response to the pump volumetric efficiency being less than a threshold pump volumetric efficiency. The controller may further comprise instructions executable to increase the valve pull-in current ramp rate in response to the pump volumetric efficiency being less than the threshold pump volumetric efficiency. Furthermore, the controller may further comprise instructions executable to adjust the valve pull-in current ramp rate independent from feedback of the valve pull-in current and the valve pull-in current ramp rate. Further still, the controller may further comprise instructions executable to adjust the valve pull-in current ramp rate independent from feedforward of the valve pull-in current and the valve pull-in current ramp rate. Further still, the fuel system may comprise a mechanical returnless fuel system or an electronic returnless fuel system.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a solenoid valve coupled to an inlet valve of a fuel injection pump, comprising:
adjusting a pull-in electrical energy of the solenoid valve, including adjusting a pull-in applied voltage level of a duty cycle of the solenoid valve and a pull-in applied voltage duration of the duty cycle, based on a fuel injection pump volumetric efficiency.

2. The method of claim 1, wherein the adjusting is performed only in response to the fuel injection pump volumetric efficiency being less than a threshold fuel injection pump volumetric efficiency.

3. The method of claim 1, wherein adjusting the pull-in electrical energy further comprises increasing a pull-in current ramp rate of the solenoid valve in response to the fuel injection pump volumetric efficiency being less than a threshold fuel injection pump volumetric efficiency.

4. The method of claim 1, wherein adjusting the pull-in applied voltage level includes increasing the pull-in applied voltage level of the solenoid valve responsive to the fuel injection pump volumetric efficiency being less than a threshold fuel injection pump volumetric efficiency.

5. The method of claim 1, wherein adjusting the pull-in applied voltage duration includes increasing the pull-in applied voltage duration of the solenoid valve responsive to the fuel injection pump volumetric efficiency being less than a threshold fuel injection pump volumetric efficiency.

6. The method of claim 1, wherein the fuel injection pump volumetric efficiency is calculated based on a commanded pump volume, an injection volume, and a pressure change in a fuel rail.

7. The method of claim 6, wherein the fuel injection pump volumetric efficiency is calculated based on a sum of a net fuel volume into a fuel rail and a fuel volume injected.

8. The method of claim 1, wherein the adjusting is performed independent from feedback of a solenoid valve current, wherein the fuel injection pump is a high-pressure fuel injection pump, and wherein the solenoid valve is disposed between the high-pressure fuel injection pump and a low-pressure fuel pump.

9. The method of claim 1, wherein the adjusting is performed independent from feed forward control based on a solenoid valve pull-in current ramp rate.

10. A method of controlling fuel injection in a direct injection fuel system, comprising:
determining a pump volumetric efficiency of a fuel injection pump coupled to a solenoid valve, and in response to the determined pump volumetric efficiency, adjusting a pull-in applied voltage duty cycle level and a pull-in applied voltage duration of the solenoid valve.

11. The method of claim 10, wherein adjusting the pull-in applied voltage duty cycle level and the pull-in applied voltage duration comprises decreasing the pull-in applied voltage duty cycle level and the pull-in applied voltage duration of the solenoid valve in response to the calculated pump volumetric efficiency being greater than a threshold pump volumetric efficiency.

12. The method of claim 10, wherein adjusting the pull-in applied voltage duty cycle level and the pull-in applied voltage duration comprises increasing the pull-in applied voltage duty cycle level and the pull-in applied voltage duration in response to the calculated pump volumetric efficiency being less than a threshold pump volumetric efficiency.

13. The method of claim 10, wherein the pump volumetric efficiency is calculated based on a desired fuel amount pumped by the fuel injection pump and an actual fuel amount pumped by the fuel injection pump, and wherein the fuel injection pump is a high-pressure fuel injection pump.

14. The method of claim 13, wherein the actual fuel amount pumped is based on a fuel quantity injected and a fuel rail pressure change over a predetermined number of pump strokes, and wherein the solenoid valve is disposed between the high-pressure fuel injection pump and a low-pressure fuel pump.

15. A vehicle system, comprising:
an engine;
a fuel system including a solenoid valve coupled to a higher pressure fuel pump, the fuel system directly injecting fuel into the engine, the fuel system further including a lower pressure fuel pump; and
a controller, including instructions executable to:
adjust a voltage level and voltage duration of a valve pull-in current of a duty cycle of the solenoid valve based on an efficiency of the higher pressure fuel pump, wherein the adjusting is performed only in response to a fuel pump volumetric efficiency being less than a threshold pump volumetric efficiency.

16. The vehicle system of claim 15, wherein the controller further comprises instructions executable to increase the voltage level and voltage duration of the valve pull-in current in response to the fuel pump volumetric efficiency being less than the threshold pump volumetric efficiency.

17. The vehicle system of claim 15, wherein the controller further comprises instructions executable to adjust the voltage level and voltage duration of the valve pull-in current independent from feedback of the valve pull-in current and a ramp rate of the valve pull-in current.

18. The vehicle system of claim 15, wherein the controller further comprises instructions executable to adjust the voltage level and voltage duration of the valve pull-in current independent from feedforward control of the valve pull-in current and a ramp rate of the valve pull-in current.

19. The vehicle system of claim 15, wherein the fuel system comprises a mechanical returnless fuel system, and wherein the solenoid valve is disposed between the higher pressure fuel pump and the lower pressure fuel pump.

20. The vehicle system of claim 15, wherein the fuel system comprises an electronic returnless fuel system.

\* \* \* \* \*